United States Patent
Seymour

[15] 3,653,527
[45] Apr. 4, 1972

[54] VEHICLE WHEEL DOLLY

[72] Inventor: Glenn C. Seymour, Bradford County, Pa.
[73] Assignee: George R. Clapp, Burdett, N.Y. a part interest
[22] Filed: Nov. 3, 1970
[21] Appl. No.: 86,543

[52] U.S. Cl............................................214/331, 214/653
[51] Int. Cl..........................................................B60b 29/00
[58] Field of Search..................214/330, 331, 332, 450, 333, 214/451, 653, 654; 294/103

[56] References Cited

UNITED STATES PATENTS 2,583,216  1/1952  Hoffman..............................214/331
2,792,139  5/1957  Lloyd...................................214/332

Primary Examiner—Gerald M. Forlenza
Assistant Examiner—Lawrence J. Oresky
Attorney—Francis G. Cole

[57] ABSTRACT

A device for removing, transporting, and replacing heavy truck wheels with tires mounted thereon. A dolly is provided with a linkage system for first gripping the wheel between the wheel rim and tire periphery at the upper side of the wheel, and thereafter lifting the wheel by force applied to the gripped portion of the wheel to release it from the axle. A single power source, preferably a hydraulic ram, applies to the linkage an upward thrust to first grip and then to raise the wheel. In a modified arrangement the linkage and power source are supported on a motor vehicle to facilitate transportation of the removed wheel.

10 Claims, 4 Drawing Figures

INVENTOR,
GLENN C. SEYMOUR
BY Francis J Cole
ATTORNEY

VEHICLE WHEEL DOLLY

SUMMARY OF THE INVENTION

Removal of heavy motor truck and tractor wheels from the vehicle for the purpose of replacement or tire repair poses a serious problem which has not heretofore been effectively solved. Such equipment as is presently available for the purpose is heavy, unwieldy and expensive. It is an object of this invention to provide wheel removal equipment which, by contrast, is relatively light in weight, readily manipulated, and inexpensive to construct and maintain.

It is a feature of the invention that the wheel to be removed is gripped firmly at its upper portion, so as to afford a stable support, before being raised to facilitate its removal from and replacement on the axle. A further feature is the employment, on a wheel dolly, of a single motive source, such as a hydraulic ram or jack, operating through a linkage system in such manner that initial upward thrust exerted by the source, serves to clamp the wheel securely between the upper portions of its rim and tire, further upward thrust serving to raise the clamping elements and the wheel as a unit to relieve the pressure between wheel and axle to allow free lateral withdrawal of dolly and wheel from the vehicle.

In a modified arrangement, the motive source and linkage system are supported on a second motor vehicle for convenient transport. With such an arrangement the motive source, for instance, a hydraulic ram, may be powered from equipment normally contained on the second vehicle and controlled therefrom.

Further objects and features of the invention as claimed hereinafter will be apparent from the appended drawings of preferred embodiments and the following detailed description thereof.

DESCRIPTION OF THE PREFERRED EMBODIMENTS.

Figure 1:
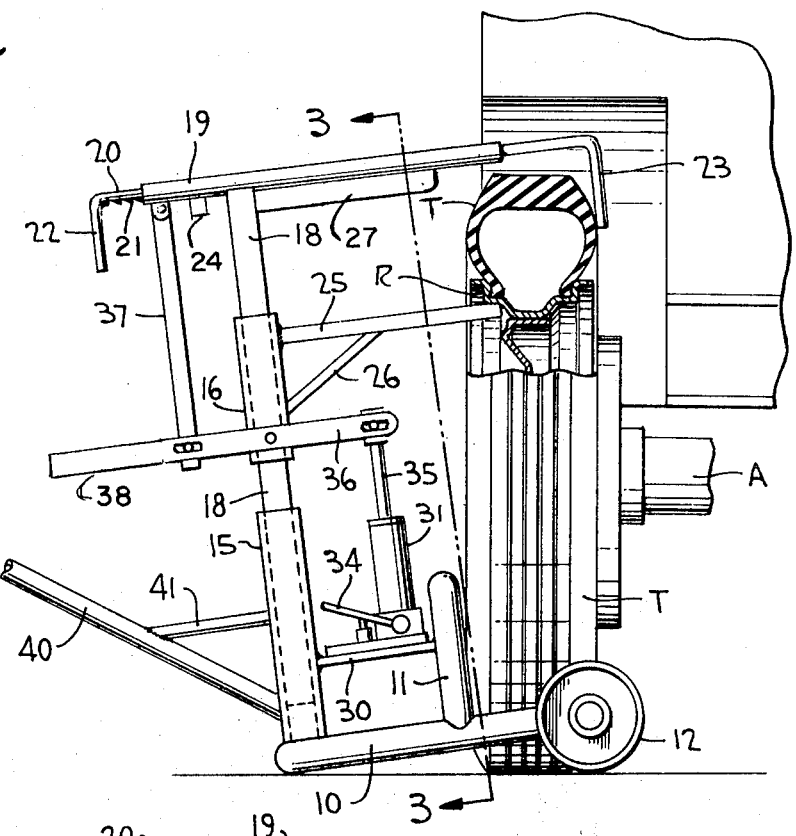
FIG. 1 is a side elevation of a tire dolly embodying the principles of the invention.
Figure 3:
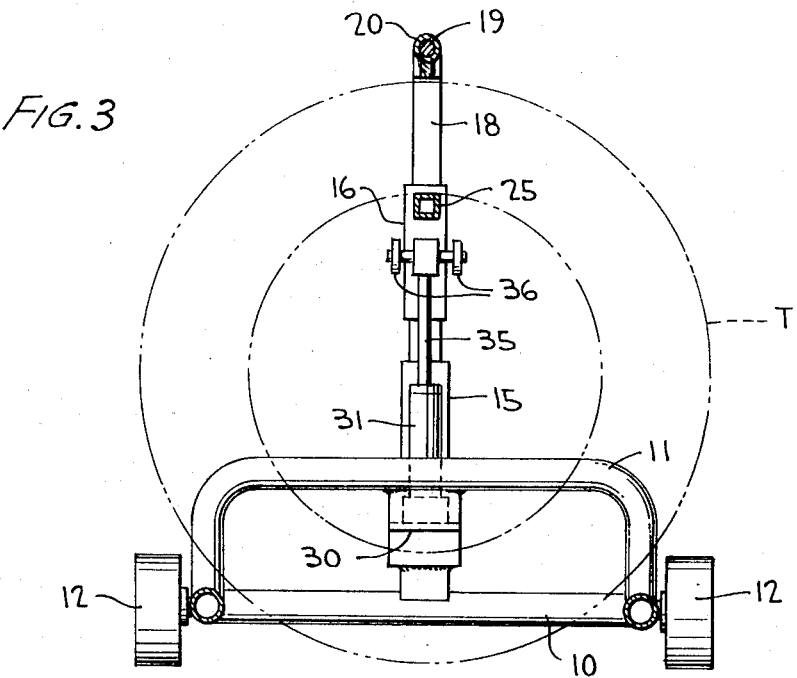
FIG. 3 is a view on the line 3—3 of FIG. 1.

Referring to the drawings in detail, a basic embodiment of the invention is illustrated in FIGS. 1 and 3, as applied to a manually transportable dolly. The dolly comprises a U-shaped base 10 mounted on wheels 12, and an upstanding U-shaped transverse brace 11 rigid therewith. Elements 10 and 11 are preferably constructed of steel tubing and constitute, together with wheels 12, a mobile base portion on which the remaining elements of the device are supported.

An upstanding sleeve 15 serving as a guide element is mounted rigidly on base 10 and receives with a sliding fit column 18. Sleeve 15 and column 18 are preferably formed of hollow stock, rectangular in cross section, as is sleeve 16, slidably mounted on column 18. A tubular sleeve 19 mounted rigidly on column 18 embraces a rod 20, which is slidable and rotatable within sleeve 19. Rod 20 has an elbow 22 at one end, serving as a handle, and an elbow 23 at the other end to engage behind a tire T mounted on rim R of a wheel to be removed from (or replaced on) vehicle axle A. Rod 20 may be rotated to permit elbow 23 to clear the tire periphery, and moved lengthwise to effect engagement of elbow 23 with the inner face of the tire, being then retained against outward endwise displacement by suitable means, for instance, cooperating ratchet teeth 21 and a spring pressed pawl in housing 24. Rotation of rod 20 frees the rod for endwise withdrawal from tire engaging position. Sleeve 19 is provided with a reinforcing web 27, which also serves as an abutment for engagement with the outer face of tire T to resist outward displacement of the wheel when gripped.

A wheel rim engaging element 25, rigid with sleeve 16 and braced by strut 26, engages beneath the upper portion of wheel rim R and serves to lift the wheel after gripping is completed, as hereinafter described.

A motive source 31 is supported on a base 30 carried by transverse brace 11 and sleeve 15. Source 31 may be a fluid activated ram or a high ratio mechanical jack, but for the embodiment of FIGS. 1 – 3 a conventional hydraulic jack is preferred. Operating handle 34 is manipulated to pump fluid into cylinder 31 to raise plunger 35, which has an articulated connection with one end of lever 36, pivoted on sleeve 16. The opposite end of lever 36 is similarly connected to link 37, pivoted to sleeve 19. Lever 36 may be extended to provide a handle 38.

To remove a wheel from its axle, the wheel rim engaging element 25 and the tire engaging means, including rod 20 and elbow 23, are first positioned as shown in FIG. 1; handle 38 may be manipulated to facilitate the operation. The dolly is then displaced to the position shown in FIG. 2, by raising handle 40, which with brace 41 are rigid with sleeve 15, to locate dolly wheels 12 beneath the wheel to be removed, thereby facilitating transport of the dolly and wheel.

While in this position, delivery of fluid to cylinder 31 raises piston 35 and the adjacent end of lever 36. Wheel rim engaging element 25 and the tire engaging means, including sleeve 19, are thereby displaced toward each other to grip the upper portion of the rim and tire therebetween. Thereafter, continued upward movement of piston 35 serves to raise rim engaging element 25, the tire engaging means, and the wheel as a unit. This eases the load so that the wheel may readily be removed from the axle, and the dolly may be then displaced laterally of the vehicle and wheeled to a desired location for removal of the tire or other repair. The lower portion of the wheel is steadied by engagement of the tire with brace 11, as shown in FIG. 2.

To replace the wheel assembly, the operation just described is reversed, the dolly being disengaged from the wheel by discharging fluid from cylinder 31 in the usual manner and releasing the tire engaging means.

Figure 2:
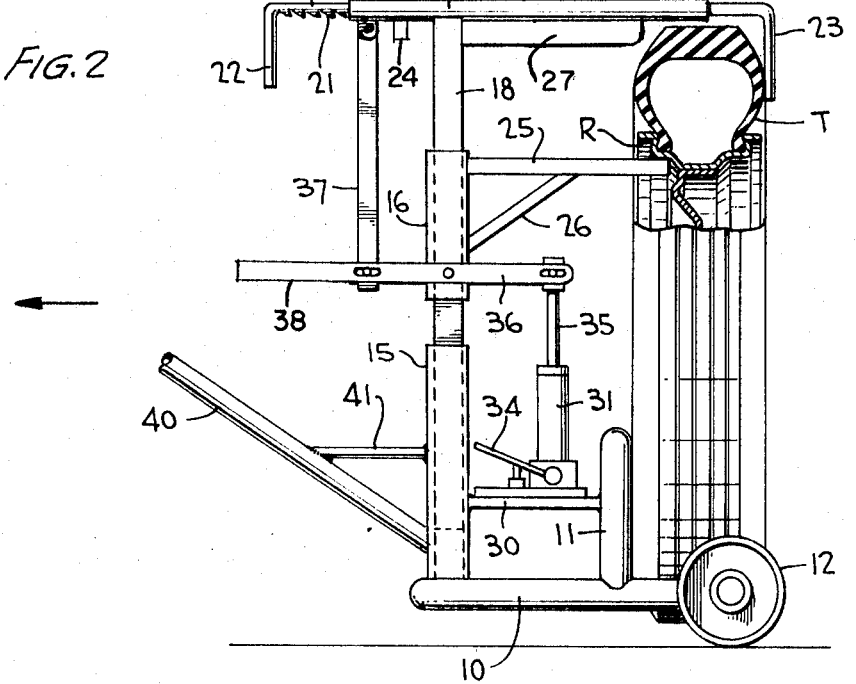
FIG. 2 is a view similar to FIG. 1 showing the dolly tilted preliminary to withdrawal of dolly and wheel from the vehicle.
Figure 4:
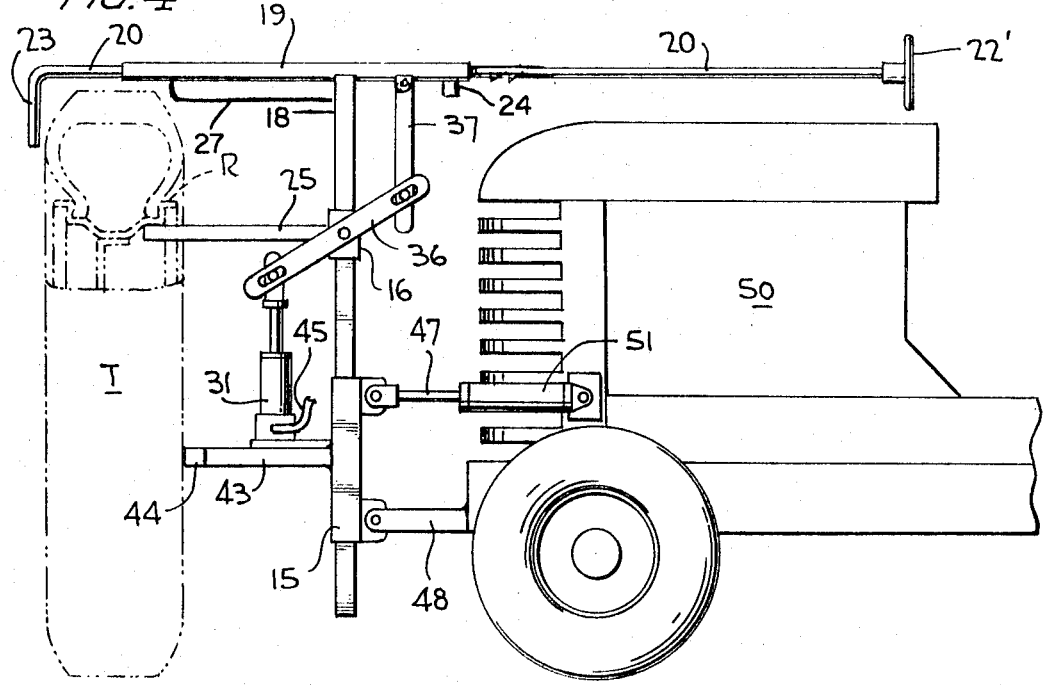
FIG. 4 is a side elevation of a modified arrangement in which the device is mounted on a second vehicle to facilitate transportation of a removed wheel.

In FIG. 4 is shown a variant of the arrangement of FIGS. 1 to 3. In lieu of the manually propelled dolly just described, FIG. 4 shows the wheel manipulating apparatus mounted on the front end of a motor vehicle, such as a tractor or truck, to facilitate transportation. The wheel handling apparatus may be essentially that of FIGS. 1 to 3, and the same reference characters are used to identify similar elements.

Thus in FIG. 4 the sleeve 15 may be pivoted at its lower end to a supporting arm 48 welded to the front end of the frame of a vehicle indicated generally at 50. The upper end of sleeve 15 may be pivotally connected to a piston 47 operable by a hydraulic cylinder 51 pivoted on the vehicle, so that the entire apparatus may be raised and lowered by controlling the supply of fluid under pressure to cylinder 51. Since vehicle 50 will usually have its own hydraulic system, cylinder 31 may be supplied with fluid under pressure through conduit 45 from the transporting vehicle 50. To permit the vehicle operator to manipulate the tire engaging elbow 23 of FIG. 4, the rod 20 may be controlled by handle 22', conveniently positioned. Other elements of the apparatus, may remain essentially unchanged, and are operated as described with reference to FIGS. 1 to 3 to first clamp and thereafter raise and remove rim R and its tire T.

Such alterations and further modifications of the preferred structure are contemplated as would occur to those skilled in the art to which the invention relates.

What is claimed is:

1. A vehicle wheel transporting device comprising, in combination, a mobile base portion and an upstanding guide element mounted on said base portion, a laterally projecting wheel rim engaging element and a laterally projecting tire engaging means mounted on said guide element for independent vertical displacement with respect to said guide element, said tire engaging means having a portion extensible laterally for engagement with the upper periphery of a tire mounted on the wheel to be transported, a motive source mounted on said base portion, and a linkage system pivotally connecting said motive source with said tier engaging means and said wheel rim engaging element, said motive source exerting an upward thrust on said linkage to first move said tire engaging means and said wheel rim engaging element toward each other, so that the wheel to be transported is gripped between said tire engaging means and said wheel rim engaging element, and thereafter to displace said tire engaging means and said wheel rim engaging element upwardly as a unit to raise said wheel relative to said mobile base portion.

2. A vehicle wheel transporting device as claimed in claim 1, in which said mobile base portion comprises a dolly having a base frame, dolly wheels on said frame, and a handle on said frame for transporting said dolly.

3. A vehicle wheel transporting device as claimed in claim 1, in which said device is mounted on the front end of a motor vehicle.

4. A vehicle wheel transporting device as claimed in claim 1, in which said tire engaging means is formed to engage both side faces and the tread at the upper portion of the tire on the wheel to be transported.

5. A vehicle wheel transporting device as claimed in claim 3 and including mounting means controllable from said motor vehicle to position said device in alignment with the wheel to be transported.

6. A vehicle wheel transporting device comprising, in combination, a mobile base portion and an upstanding sleeve mounted on said base portion, a column slidably received by said sleeve, a second sleeve slidable on said column, a laterally projecting wheel rim engaging element rigid with said second sleeve, tire engaging means mounted on said column above said second sleeve and projecting laterally thereof, said tire engaging means having a portion extensible laterally for engagement with the upper periphery and the inner face of a tire mounted on the wheel to be transported, a lever pivoted to said second sleeve, a motive source mounted on said base portion and pivotally connected to one end of said lever to exert an upward thrust thereto, and means connecting the opposite end of said lever to said tire engaging means, whereby initial upward thrust exerted by said source on said lever serves to move said second sleeve and said tire engaging means toward each other, so that the wheel to be transported is gripped between said tire engaging means and said wheel rim engaging element, and whereby continued upward thrust exerted by said source on said lever serves to displace said second sleeve and said column upwardly as a unit to raise said wheel relative to said mobile base portion.

7. A vehicle wheel transporting device as claimed in claim 6, in which said mobile base portion comprises a dolly having a base frame, dolly wheels on said frame, and a handle on said frame for transporting said dolly.

8. A vehicle wheel transporting device as claimed in claim 6, in which said device is mounted on the front end of a motor vehicle.

9. A vehicle wheel transporting device as claimed in claim 6, in which said tire engaging means is formed to engage both side faces and the tread at the upper portion of the tire on the wheel to be transported.

10. A vehicle wheel transporting device as claimed in claim 8 and including mounting means controllable from said motor vehicle to position said device in alignment with the wheel to be transported.

* * * * *